US010927584B2

(12) United States Patent
Pohl et al.

(10) Patent No.: US 10,927,584 B2
(45) Date of Patent: Feb. 23, 2021

(54) ADJUSTMENT DEVICE AND METHOD FOR ADJUSTING A VEHICLE PART

(71) Applicant: Brose Fahrzeugteile GmbH & Co. Kommanditgesellschaft, Bamberg, Bamberg (DE)

(72) Inventors: Florian Pohl, Ebersdorf (DE); Joachim Nusser, Bamberg (DE)

(73) Assignees: Brose Fahrzeugteile GmbH & Co., Bamberg (DE); Kommanditgesellschaft, Bamberg, Bamberg (DE)

( * ) Notice: Subject to any disclaimer, the term of this patent is extended or adjusted under 35 U.S.C. 154(b) by 216 days.

(21) Appl. No.: 16/044,148

(22) Filed: Jul. 24, 2018

(65) Prior Publication Data

US 2019/0078370 A1 Mar. 14, 2019

(30) Foreign Application Priority Data

Sep. 11, 2017 (DE) ..................... 10 2017 215 961.8

(51) Int. Cl.

*B62D 25/00* (2006.01)
*E05F 15/46* (2015.01)
*E05F 15/79* (2015.01)

(52) U.S. Cl.

CPC .............. *E05F 15/46* (2015.01); *E05F 15/79* (2015.01); *E05Y 2400/814* (2013.01);
(Continued)

(58) Field of Classification Search

CPC .... E05F 15/46; E05F 15/79; E05Y 2400/814; E05Y 2900/531; E05Y 2900/546; E05Y 2900/548; G05B 9/02
(Continued)

(56) References Cited

U.S. PATENT DOCUMENTS

2005/0237014 A1* 10/2005 Murray ................. E05F 15/668 318/280
2007/0241585 A1 10/2007 Shimizu
(Continued)

FOREIGN PATENT DOCUMENTS

CN 1990321 A 4/2007
CN 101824948 A 9/2010
(Continued)

OTHER PUBLICATIONS

Chinese First Office action dated Nov. 28, 2019 issued in corresponding CN Application No. 201811051380.6, 6 pages, with English translation, 1 page.

*Primary Examiner* — Jerry E Redman
(74) *Attorney, Agent, or Firm* — Lewis Roca Rothgerber Christie LLP

(57) ABSTRACT

It is provided an adjustment device for the power-operated adjustment of a vehicle part that is adjustable on a vehicle along an adjustment path between a closed position and at least one open position, comprising a sensor device by means of which an obstacle in the adjustment path of the vehicle part can be detected in a contactless way and upon detection of an obstacle in the adjustment path of the vehicle part an obstacle signal can be generated, and comprising an electronic control device coupled to at least one drive for the adjustment of the vehicle part, at least one actuating element for generating an adjustment signal and the sensor device, by means of which on the basis of the adjustment signal the at least one drive can be actuated for the power-operated adjustment of the vehicle part.

19 Claims, 3 Drawing Sheets

(52) U.S. Cl.
CPC ... *E05Y 2900/531* (2013.01); *E05Y 2900/546* (2013.01); *E05Y 2900/548* (2013.01)

(58) Field of Classification Search
USPC .......................................... 49/26, 28; 296/56
See application file for complete search history.

(56) References Cited

U.S. PATENT DOCUMENTS

| | | | | |
|---|---|---|---|---|
| 2010/0228447 | A1 | 9/2010 | Serban et al. | |
| 2011/0118946 | A1 | 5/2011 | Reimann et al. | |
| 2013/0139440 | A1 | 6/2013 | Wechs | |
| 2013/0151071 | A1 | 6/2013 | Lee | |
| 2014/0207343 | A1 | 7/2014 | Kigoshi et al. | |
| 2015/0073666 | A1 | 3/2015 | Dotterweich et al. | |
| 2015/0121758 | A1 | 5/2015 | Pohl | |
| 2015/0224859 | A1 | 8/2015 | Warburton et al. | |
| 2015/0267454 | A1 | 9/2015 | Wuerstlein et al. | |
| 2015/0369941 | A1* | 12/2015 | Pribisic | E05F 15/44 324/658 |
| 2017/0075019 | A1* | 3/2017 | Pribisic | E05F 15/46 |
| 2018/0051502 | A1 | 2/2018 | Roos et al. | |
| 2018/0080270 | A1* | 3/2018 | Khan | E05F 15/611 |
| 2018/0363357 | A1* | 12/2018 | Polewarczyk | E05F 15/40 |
| 2018/0363359 | A1* | 12/2018 | Watanabe | E05F 15/73 |
| 2019/0376333 | A1* | 12/2019 | Rrumbullaku | E05F 15/43 |
| 2020/0123816 | A1* | 4/2020 | Taylor | E05F 15/622 |
| 2020/0141176 | A1* | 5/2020 | Ichinose | E05F 15/73 |
| 2020/0149329 | A1* | 5/2020 | Miyashiro | B60T 7/22 |
| 2020/0165860 | A1* | 5/2020 | Gempel | E05F 15/73 |
| 2020/0232262 | A1* | 7/2020 | Marlia | B60R 25/01 |

FOREIGN PATENT DOCUMENTS

| | | | |
|---|---|---|---|
| CN | 103161380 | A | 6/2013 |
| CN | 104631991 | A | 5/2015 |
| CN | 104718095 | A | 6/2015 |
| DE | 10 2010 038 687 | A1 | 2/2012 |
| DE | 10 2012 107 116 | A1 | 2/2014 |
| DE | 10 2012 107 800 | A1 | 2/2014 |
| DE | 10 2014 200 819 | A1 | 7/2014 |
| DE | 10 2013 015 119 | A1 | 3/2015 |
| DE | 10 2017 214 174 | A1 | 2/2018 |
| EP | 2 009 212 | A2 | 12/2008 |
| EP | 2 285 629 | B1 | 3/2012 |
| WO | WO 2007/071868 | A2 | 6/2007 |

* cited by examiner

ADJUSTMENT DEVICE AND METHOD FOR ADJUSTING A VEHICLE PART

REFERENCE TO RELATED APPLICATION

This application claims priority to German Patent Application No, 10 2017 215 961.8 filed on Sep. 11, 2017, the entirety of which is incorporated by reference herein.

BACKGROUND

This invention relates to an adjustment device for the power-operated adjustment of a vehicle part and to a method for adjusting a vehicle part.

Comparable adjustment devices and methods for adjusting a vehicle part are known for example from DE 10 2010 038 687 A1 and EP 2 009 212 A2.

On vehicles, different vehicle parts each are adjustable in a power-operated way along an adjustment path between a closed position and at least one open position. For example, liftgates or vehicle doors are to be opened and to be closed by means of at least one motor drive. The adjustment of the vehicle part here can be triggered by a user in different ways. For example, an actuating element can be provided on the vehicle and in particular on the vehicle part to be adjusted, by means of which an operating event triggered by a user can be detected and in response to the detection of the operating event an adjustment signal is generated. It is known for example to provide an actuating element in the form of an internal button on an inside of a liftgate, which on actuation triggers a closing of the liftgate.

To avoid that on closing or opening a power-operated vehicle part collides with an obstacle, there is usually provided a sensor device (as part of an anti-pinch protection system) by means of which an obstacle in the adjustment path of the vehicle part can be detected in a contactless way and upon detection of an obstacle in the adjustment path of the vehicle part an obstacle signal is generated in order to stop or reverse the adjusting movement of the vehicle part. For the detection of an obstacle the sensor device defines a monitoring region in the surroundings of the vehicle part to be adjusted in order to for example infer an obstacle from a changing capacitance in this monitoring region.

Especially in actuating elements that lie in such a monitoring region of the sensor device the problem frequently arises that the user or at least a body part of the user still is in the monitoring region when the user has actuated the actuating element. When a user for example presses an internal button on an open liftgate in order to trigger the closing of the same, the hand of the user regularly still is in a capacitively monitored monitoring region of a sensor device provided on the liftgate. The hand of the user then possibly is interpreted as a potential obstacle in the adjustment path and the liftgate is not closed.

To avoid this, it is known to completely deactivate the sensor device for some time when an adjustment signal has been triggered by actuating an actuating element provided on the vehicle part. However, this also involves the risk that the vehicle part is adjusted although an obstacle actually is present in the adjustment path.

SUMMARY

Against this background it is an object of the present invention to provide a corresponding adjustment device as well as a method for manufacturing a vehicle part, which represent an improvement in this respect.

This object is solved by an adjustment device with features as described herein as well as by a method with features as described herein.

According to a first aspect it is proposed that an electronic control device coupled to at least one drive for the power-operated adjustment of a vehicle part, to at least one actuating element and to a sensor device is configured to queue an adjustment signal generated by means of the at least one actuating element until an obstacle signal generated by means of the sensor device no longer is present, and only then actuate the at least one drive for the adjustment of the vehicle part.

The electronic control device thus is configured to detect whether both an obstacle signal and an adjustment signal are present and in response thereto to at least temporarily store that the adjustment signal has been generated, in order to trigger an adjustment of the vehicle part with a delay as soon as the obstacle signal no longer is present. By means of the electronic control device an actuation of the actuating element thus can be registered and queued, wherein then an execution of the corresponding action—here of the adjustment of the vehicle part—only is effected when it is ensured that the user who has actuated the actuating element has left a monitoring region of the sensor device and for example his hand (with which the user has actuated the actuating element) also is no longer present in this monitoring region.

In one design variant the electronic control device furthermore is configured to queue a generated adjustment signal merely for a specified time interval and at the end of the specified time interval to not actuate the at least one drive for the adjustment of the vehicle part, when the obstacle signal is present (continues to be present) until the end of the time interval. The electronic control device here comprises e.g. a timer for specifying the time interval. The control device is configured to monitor (continuously) whether the obstacle signal continues to be present from the presence of the adjustment signal for the specified time interval. When the obstacle signal ceases to be present, the adjustment of the vehicle part is effected. However, when after actuation of the actuating element for a specified time interval it cannot definitely be excluded that an obstacle is present in the adjustment path of the vehicle part due to the existing obstacle signal, the electronic control device discards the generated adjustment signal and an adjustment of the vehicle part is not effected.

In one design variant, the time interval specified therefor is less than or equal to 10 seconds, in particular less than or equal to 7 seconds. For example, the time interval is greater than or equal to 2 seconds and less than or equal to 5 seconds. Thus, for the specified time interval $T_D$ it then applies e.g. 2 s$\leq t_D \leq$5 s.

As already explained above, the actuating element can be provided for example on the vehicle part itself. In one design variant, the at least one actuating element is a button to be actuated by touching or pressing, which is arranged on the vehicle part to be adjusted. Hence, the actuating element also can just lie in a monitoring region that is monitored by means of the sensor device for an obstacle in the adjustment path of the vehicle part.

In one design variant the electronic control device furthermore is configured to actuate the at least one drive for the adjustment of the vehicle part after cessation of the obstacle signal only after a defined delay time interval has elapsed. When it is thus detected by means of the electronic control device that a potential obstacle no longer is present in the adjustment path of the vehicle part and hence for example a user has moved his hand sufficiently far away from the vehicle part to be adjusted, an actuation of the at least one drive for the adjustment of the vehicle part is not immediately effected. Such an actuation rather is effected only after a defined delay time interval has elapsed. For this purpose, the electronic control device for example can include a delay element for the delayed actuation of the at least one drive. By providing a delay time interval it can be avoided for example that the vehicle part is stopped and/or reversed again shortly after starting to move and hence after the beginning of the adjustment, as the user moving away or the hand of the user moving away from the vehicle part and possibly from the actuating element provided thereon again gets into the monitoring region due to the adjustment of the vehicle part and the sensor of the sensor device provided thereon. By providing the delay interval, possible erroneous activations of the sensor device thus are prevented, in particular when the sensor device is part of a capacitive anti-pinch protection system.

The delay time interval for example is less than or equal to 2 seconds, in particular less than or equal to 1 second. In one design variant, the delay time interval lies in a range of greater than or equal to 0.2 seconds and less than or equal to 0.5 seconds. For a delay time interval $t_V$ it thus applies e.g. $0.2\ s \leq t_V \leq 0.5\ s$. For example, the delay time interval is preset at 0.5 seconds.

The electronic control device can be coupled to at least one signaling means that acoustically and/or visually indicates the generation of an adjustment signal. By means of the signaling means it can thus be acknowledged for example acoustically and/or visually that an actuation of the actuating element has been recognized.

In one design variant, in which a generated adjustment signal is queued merely for a specified time interval and possibly discarded at the end of the specified time interval, in case an obstacle signal continues to be present, the at least one signaling means also can acoustically and/or visually indicate that an adjustment signal has been generated and that the obstacle signal was present up to the end of the time interval. A user thus is acoustically and/or visually informed that due to a potential obstacle in the adjustment path of the vehicle part an adjustment of the vehicle part will not be effected. An acknowledgment that an actuation of the actuating element has been recognized and an acknowledgment that the adjustment of the vehicle part is not made due to a potential obstacle can be indicated in various ways. For example, the actuation of the actuating element is acknowledged by a single beep, while the non-occurrence of the adjustment after elapse of the specified time interval is acknowledged by a multiple beep. The electronic control device thus is configured to acoustically and/or visually indicate in various ways by means of the at least one signaling means that (a) an adjustment signal has been generated and (b) that the obstacle signal was present up to the end of the time interval.

The vehicle part to be adjusted for example can be a liftgate, an engine hood, a trunk lid or a vehicle door of a vehicle.

A further aspect of the proposed solution by which the object stated above can be solved relates to an adjustment device in which the electronic control device is configured to actuate the at least one drive for the adjustment of the vehicle part from its closed position or the at least one open position at a reduced adjustment speed in the presence of an adjustment signal and an obstacle signal, which adjustment speed is less than an adjustment speed at which the vehicle part is adjusted by means of the electronic control device when the adjustment signal, but no obstacle signal is present.

In this variant, an adjustment of the vehicle part thus can be triggered immediately after a proper actuation of an actuating element, although a (moving) obstacle still is detected in the adjustment path of the vehicle part. As it is assumed here that the adjustment of the vehicle part goes back to a deliberate decision of a user, a slow adjustment of the vehicle part is started nevertheless, i.e. a kind of "creep". For example, the user who shortly before has actuated the actuating element thereby is given the opportunity to move away from the adjustment path of the vehicle part without considerably delaying the adjustment of the vehicle part. The electronic control device here can be configured to stop and/or reverse the vehicle part, in case the obstacle in the adjustment path of the vehicle part is not removed and the vehicle part has approached the obstacle—at a reduced adjustment speed—up to a defined safety distance. Though an adjustment of the vehicle part thus is started at a reduced adjustment speed, although an obstacle is detected in the adjustment path, it can nevertheless safely be excluded in this way that the vehicle part collides with this obstacle. An obstacle moving away sufficiently fast from a slowly moving vehicle part, such as for example the hand of a user or the user himself, thus does not prevent, however, that the vehicle part is adjusted. When an obstacle no longer is detected in the adjustment path, an actuation of the at least one drive for the adjustment of the vehicle part then can also be effected at an increased or "normal" adjustment speed.

A further aspect of the proposed solution relates to a method for the power-operated adjustment of a vehicle part. Analogous to the two aspects of an adjustment device of the invention as explained above it is provided in accordance with such a method that (a) a generated adjustment signal is queued until an obstacle signal no longer is present, and only then the at least one drive for the adjustment of the vehicle part is actuated, or (b) in the presence of an adjustment signal and an obstacle signal the at least one drive for the adjustment of the vehicle part from the closed position or the at least one open position is actuated at a reduced adjustment speed that is less than an adjustment speed at which the vehicle part is adjusted when the adjustment signal, but no obstacle signal is present.

For carrying out the method an adjustment device according to the invention can be used. The advantages and features explained above and below for design variants of an adjustment device according to the invention thus also apply for design variants of a method according to the invention, and vice versa.

According to another aspect there is proposed an adjustment device that likewise solves the object set forth above and therefor includes a sensor device by means of which an obstacle in a monitoring region of the sensor device can be detected in a contactless way, wherein the actuating element lies within this monitoring region. The sensor device and/or the electronic control device then are configured here such that an obstacle in a section of the monitoring region in which the actuating element lies at least temporarily does not lead to an actuation of the at least one drive in order to stop and/or reverse an adjustment of the vehicle part when an adjustment signal has been generated.

While an obstacle in other sections of the monitoring region thus leads to a stopping and/or reversing of an adjustment of the vehicle part, an obstacle in that section of the monitoring region in which the actuating element lies is not used for triggering a (drive) signal on the at least one drive in order to stop and/or reverse the vehicle part. It thereby is avoided that for example the hand of a user that has acted on the actuating element in order to trigger the adjustment of the vehicle part subsequently is immediately detected as a potential obstacle and leads to the stopping and/or reversing of the adjusting movement. However, instead of deactivating the complete sensor system for a limited time, merely a part of the monitoring region here is at least temporarily left out in this respect.

In one design variant it can therefor be provided for example that a monitoring of the section of the monitoring region in which the actuating element lies can at least temporarily be deactivated upon generation of the adjustment signal, so that an obstacle in this section (at least for a specified deactivation period) does not lead to the generation of an obstacle signal when an adjustment signal has been generated. Thus, when the at least one actuating element, which for example is arranged on the vehicle part itself, is actuated properly, the section of the monitoring region in which this actuating element lies is deactivated selectively, while the remaining sections of the monitoring region remain active in order to be able to detect a potential obstacle in the adjustment path.

In an alternative design variant the electronic control device is configured to at least temporarily ignore an obstacle signal that goes back to a detected obstacle in the section of the monitoring region in which the actuating element lies, so that such an obstacle signal does not lead to the actuation of the at least one drive in order to stop and/or reverse an adjustment of the vehicle part, when at the same time or shortly before, i.e. for example within less than one second, an adjustment signal has also been generated. In this variant, the sensor device is equipped and provided to differentiate in what sections of a monitoring region an obstacle is present. When an obstacle signal then goes back to a potential obstacle in the region of the actuating element, after the same has been actuated, such an obstacle signal is at least not used for a defined period in order to stop and/or reverse the triggered adjusting movement of the vehicle part.

Based on the aspect explained above there is furthermore also proposed a method for the power-operated adjustment of a vehicle part, in which an obstacle in a section of the monitoring region in which the actuating element lies at least temporarily does not lead to an actuation of the at least one drive in order to stop and/or reverse an adjustment of the vehicle part when an adjustment signal has been generated by means of this actuating element.

For carrying out such a method a corresponding adjustment device can then be used of course, so that here as well advantages and features of design variants of such an adjustment device as explained above and below also apply for design variants of a corresponding method, and vice versa.

BRIEF DESCRIPTION OF THE DRAWINGS

The attached Figures by way of example illustrate possible design variants of the proposed solution.

DETAILED DESCRIPTION

Figure 1:
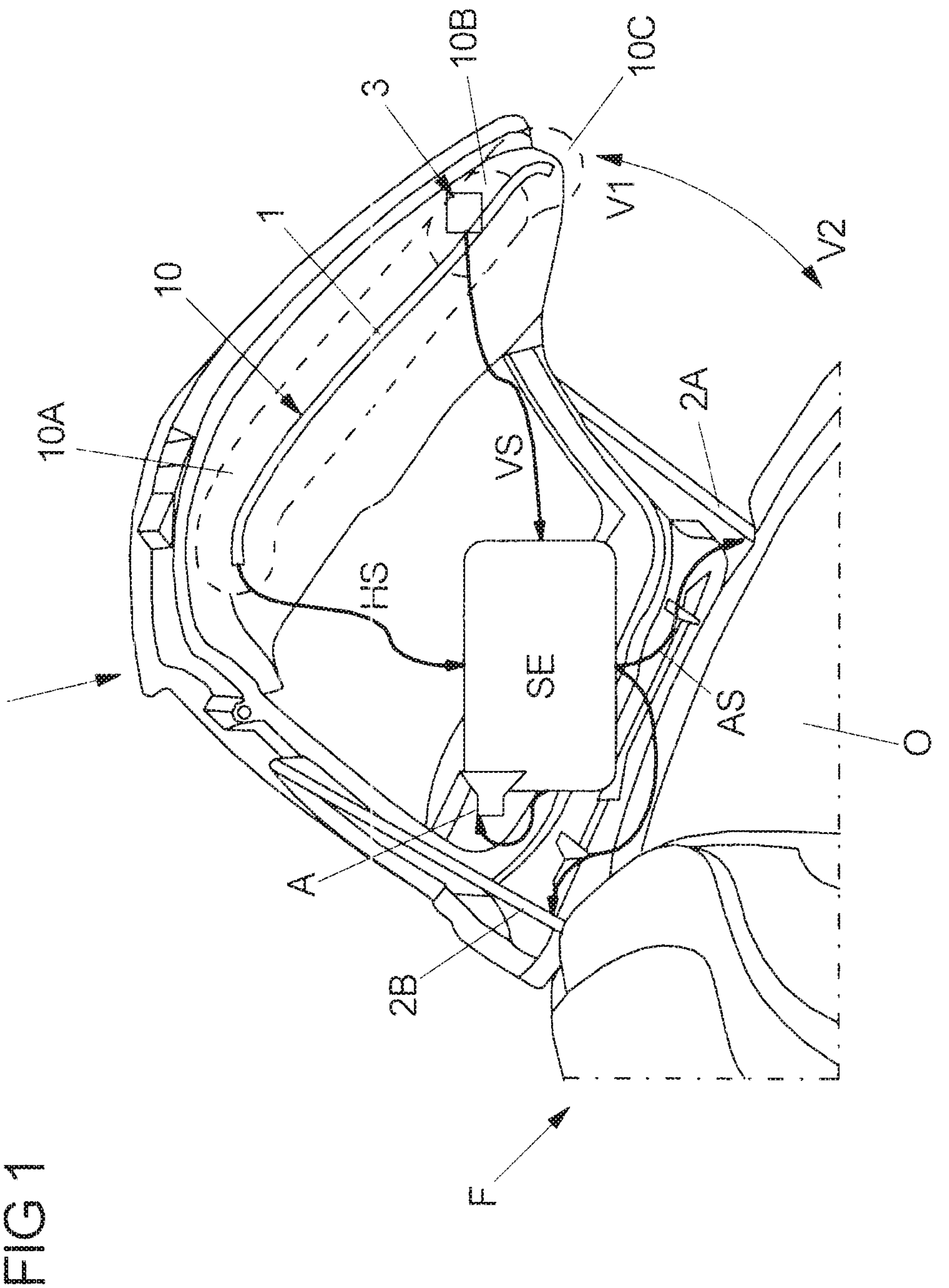
FIG. 1 partially shows a rear end of a vehicle with a design variant of an adjustment device according to the invention, by means of which design variants of a method according to the invention can be carried out.

FIG. 1 partially shows a vehicle F with an open liftgate H that in the open position shown in FIG. 1 provides access to a (liftgate) opening O at the rear end of the vehicle F. The litigate H can be adjusted in a power-operated way by means of two electromotive drives 2A and 2B between the illustrated open position and a closed position in which the liftgate H completely closes the opening O. The adjustment of the liftgate H is effected along two opposite adjustment directions V1 and V2 about a swivel axis in the roof area of the vehicle F.

The adjustment of the liftgate H by means of the two drives 2A and 2B is controlled via an electronic control device SE. This control device SE is coupled to the two drives 2A and 2B and can transmit drive signals AS to the same in order to open or close the liftgate H.

In the present case, the adjustment of the liftgate H can be triggered via different operating events. For example, for opening the liftgate H into the illustrated open position an e.g. capacitive sensor device is provided in the region of the rear bumper of the vehicle F, by means of which a kick movement of a foot can be detected as an operating event (not shown in FIG. 1). Alternatively or in addition, the liftgate H can be opened or closed by means of a remote control unit.

Moreover, an actuating element in the form of an internal button 3 is provided on an inside of the liftgate H. When this internal button 3 is actuated by a user with an open liftgate H, an adjustment signal VS is generated, which causes the electronic control device SE to actuate the drives 2A and 2B for closing the liftgate H.

In order to avoid during the power-operated closing of the liftgate H that the same collides with an obstacle and for example pinches body parts of a user between a lower edge of the liftgate H and a trunk sill of the vehicle F, a capacitive sensor device 1 is provided. This sensor device 1 therefor includes e.g. at least one sensor electrode on the lower edge of the liftgate H. Such a sensor electrode or further electrodes furthermore can extend along the long sides of the liftgate H.

Via the sensor device 1 a monitoring region 10 is defined in the surroundings of the liftgate H, which is monitored e.g. for a changing capacitance. When a potential obstacle in the adjustment path of the closing liftgate H is inferred from such a changing capacitance, an obstacle signal HS is generated on the part of the sensor device 1. When such an obstacle signal HS is present on the electronic control device SE, the same actuates the drives 2A and 2B for stopping and/or reversing the adjusting movement of the closing liftgate H in order to avoid a collision with the potential obstacle.

In the present case, the internal button 2 also lies in the monitoring region 10 of the sensor device 1. In principle, this can now lead to the fact that the hand of a user with which the user actuates the internal button 3 for closing the open liftgate H is detected as a potential obstacle in the adjustment path of the liftgate H. The electronic control device SE then possibly prevents the closing of the liftgate H, although this closing is expressly desired by the user.

According to one design variant the monitoring region 10 now can be divided into different monitoring segments or sections 10A, 10B and 10C. After pressing the internal button 3 for closing the liftgate H, an obstacle in that monitoring region 10B in which the internal button 3 lies then is deactivated or at least temporarily an obstacle signal HS generated thereby is ignored on the part of the electronic control device SE in order to ensure that the hand of a user moving away from the liftgate H and in particular from the internal button 3 does not lead to the response of an anti-pinch protection system and hence to the stopping and/or reversing of the adjusting movement of the closing liftgate H.

In an alternative design variant the electronic control device SE is configured to queue an adjustment signal VS generated by the actuation of the internal button 3 until an obstacle signal HS no longer is provided by the sensor device 1 and thus to actuate the drives 2A and 2B for the adjustment of the liftgate H (with a delay) only at a time when no more obstacle is present in the monitoring region 10. Hence, as soon as a user has moved his hand, with which the user has acted on the internal button 3 for closing the liftgate H, sufficiently far away from the monitoring region 10, closing of the liftgate H is effected automatically, with a corresponding time delay.

Figure 2:
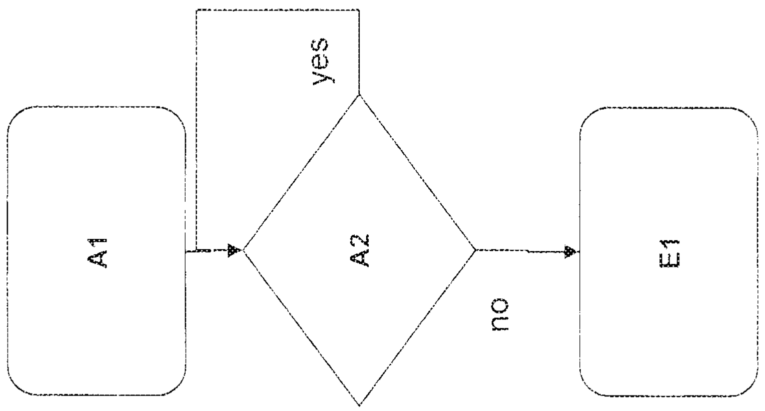
FIG. 2 shows a flow diagram of a design variant of a method according to the invention.

Such a design variant is illustrated by means of the flow diagram of FIG. 2.

In a first method step A1, an operating event triggered by a user by actuation of the internal button 3 initially is recognized. An adjustment signal VS generated thereby is registered on the part of the electronic control device SE and queued. Subsequently, it is checked in a method step A2 whether an obstacle is present in the monitoring region 10. When this is the case, an obstacle signal HS is present on the electronic control device SE, which signal has been generated by means of the sensor device 1. As long as this obstacle signal HS is present, the liftgate H is not adjusted. Only upon cessation of the obstacle signal HS is the adjustment of the liftgate H effected in a method step E1.

Figure 3:
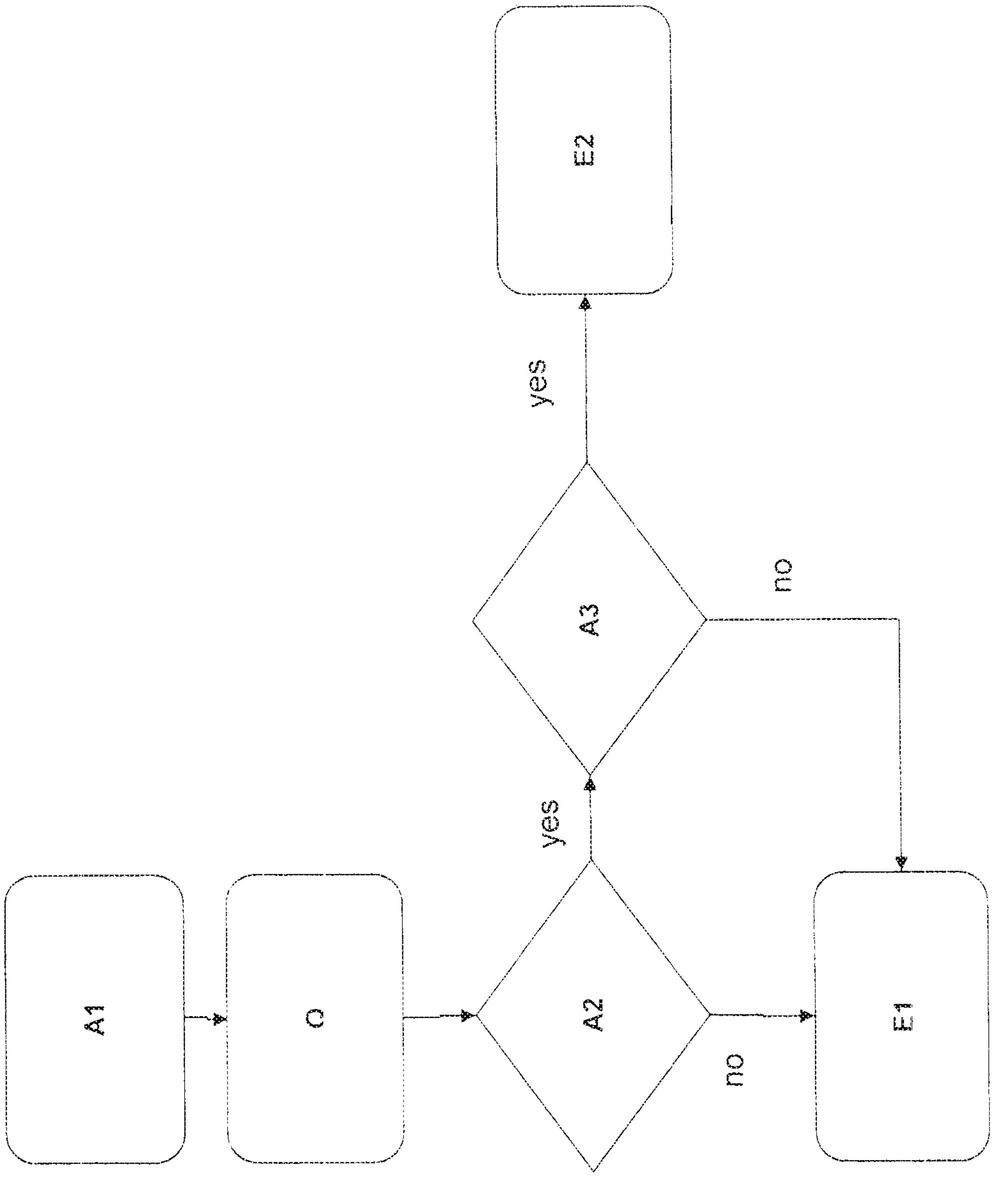
FIG. 3 shows a flow diagram of a further design variant of a method according to the invention.

In a possible development, for which a flow diagram is represented in FIG. 3, the queuing of the generated adjustment signal VS by the electronic control device SE is effected only for a limited period and hence for a specified time interval of e.g. 5 seconds. When the obstacle signal HS does not cease within this period from the generation of the adjustment signal HS, an adjustment of the liftgate H is not effected.

Furthermore, the actuation of the internal button 3 initially is acoustically acknowledged after the first method step A1, in which the actuation of the internal button 3 has been detected and the adjustment signal VS has been generated and queued, via a signaling means—in FIG. 1 in the form of an audio output unit A—coupled to the electronic control device SE. After the corresponding method step Q the check for the presence of an obstacle signal HS then is made in the method step A2. When such an obstacle signal HS is present, it is repeatedly or continuously checked for a specified period, of e.g. 5 seconds, whether the obstacle signal HS still is present or ceases (method step A3—"timeout reached?"). When the cessation of the obstacle signal HS is recognized within this time interval, the adjustment of the liftgate H is made in method step E1.

When on the other hand the elapse of the time interval in method step A3 and hence a corresponding timeout is reached without the obstacle signal HS having ceased, an adjustment of the liftgate H fails to be made. In a method step E2 merely an acoustic information is provided to the user via the audio output unit A that an adjustment of the liftgate H is not made. For example, this is indicated by a multiple beep.

Alternatively or in addition to an acoustic information about a proper actuation of the internal button 3 or the non-occurrence of the adjustment due to a still present obstacle signal HS a visual information can of course also be output to the user, for example via one or more corresponding lamps in the region of the vehicle rear and/or on the liftgate H.

In a development of the method according to FIG. 3 it is additionally provided that an actuation of the drives 2A and 2B by the electronic control device SE is effected with a delay when the obstacle signal HS ceases within the time interval and hence during the check in method step A2. Here, an adjustment of the liftgate H for closing thus is not triggered immediately as soon as no more obstacle is detected in the monitoring region 10 by means of the sensor device 1. Rather, a corresponding actuation of the drives 2A and 2B and hence an adjustment of the liftgate H is effected only after the elapse of a defined delay time interval, of e.g. 0.5 seconds. A corresponding waiting time, before the adjustment of the liftgate H begins, avoids that the adjusting liftgate H and hence the monitoring region 10 moving along with the same catches up with the hand of the user moving away from the internal button 3, and hence a stopping and/or reversing of the adjusting movement of the liftgate H still is triggered after all. The provision of a corresponding delay time interval thus can additionally ensure that a user can move his hand away from the internal button 3 without this hand again leading to the activation of the anti-pinch protection system already shortly after the adjustment of the liftgate H.

LIST OF REFERENCE NUMERALS

1 sensor device
10 monitoring region
10A, 10B, 10C monitoring segment (section of the monitoring region)
2A, 2B drive
3 internal button (actuating element)
A audio output unit (signaling means)
AS drive signal
F vehicle
H liftgate (vehicle part)
HS obstacle signal
O (liftgate) opening
SE electronic control device
V1, V2 adjustment direction
VS adjustment signal

The invention claimed is:

1. An adjustment device for a power-operated adjustment of a vehicle part that is adjustable on a vehicle along an adjustment path between a closed position and at least one open position, the adjustment device comprising at least one drive for generating an adjusting force for the power-operated adjustment of the vehicle part, at least one actuating element, configured to detect an operating event for adjusting the vehicle part triggered by a user and to generate, in response to a detection of the operating event an adjustment signal, a sensor device configured to detect an obstacle in the adjustment path of the vehicle part in a contactless way and to generate, upon detection of an obstacle in the adjustment path of the vehicle part an obstacle signal, and an electronic control device coupled to the at least one drive, the at least one actuating element and the sensor device, and configured to actuate, based on the adjustment signal, the at least one drive for the power-operated adjustment of the vehicle part and to actuate, if the obstacle signal is present, the at least one drive for stopping and/or reversing an adjustment of the vehicle part, wherein (a) the electronic control device is configured to queue a generated adjustment signal until an obstacle signal no longer is present, and to only then actuate the at least one drive for the adjustment of the vehicle part, or (b) the electronic control device is configured to actuate the at least one drive in the presence of an adjustment signal and an obstacle signal for the adjustment of the vehicle part from the closed position or the at least one open position at a reduced adjustment speed that is less than an adjustment speed at which the vehicle part is adjusted via the electronic control device when the adjustment signal, but no obstacle signal, is present.

2. The adjustment device according to claim 1, wherein the electronic control device is configured to queue a generated adjustment signal merely for a specified time interval and, at an end of the specified time interval, to not actuate the at least one drive for the adjustment of the vehicle part when the obstacle signal is present until the end of the time interval.

3. The adjustment device according to claim 2, wherein the specified time interval is less than or equal to 10 seconds.

4. The adjustment device according to claim 2, wherein the electronic control device is coupled to at least one signaling means which acoustically and/or visually indicates the generation of an adjustment signal, wherein the electronic control device is configured to acoustically and/or visually indicate by the at least one signaling means that an adjustment signal has been generated and that the obstacle signal was present up to the end of the time interval.

5. The adjustment device according to claim 4, wherein the electronic control device is configured to acoustically and/or visually indicate in various ways by the at least one signaling means that (a) an adjustment signal has been generated and that the obstacle signal was present up to the end of the time interval.

6. The adjustment device according to claim 1, wherein the actuating element is provided on the vehicle part.

7. The adjustment device according to claim 6, wherein the actuating element lies in a monitoring region that is monitored via the sensor device for an obstacle in the adjustment path of the vehicle part.

8. The adjustment device according to claim 1, wherein the electronic control device is configured to actuate the at least one drive for the adjustment of the vehicle part only after elapse of a defined delay time interval when the obstacle signal is no longer present.

9. The adjustment device according to claim 8, wherein the delay time interval is less than or equal to 2 seconds.

10. The adjustment device according to claim 8, wherein the delay time interval is less than or equal to 1 s.

11. The adjustment device according to claim 8, wherein the delay time interval lies in the range of 0.2 s to 0.5 s.

12. The adjustment device according to claim 1, wherein the sensor device is equipped and provided for the capacitive detection of an obstacle in the adjustment path of the vehicle part.

13. The adjustment device according to claim 1, wherein the electronic control device is coupled to at least one signaling means which acoustically and/or visually indicates the generation of an adjustment signal.

14. The adjustment device according to claim 1, wherein the vehicle part is a liftgate, an engine hood, a trunk lid or a vehicle door.

15. A method for a power-operated adjustment of a vehicle part that can be adjusted on a vehicle along an adjustment path between a closed position and at least one open position, wherein at least the following is provided for the power-operated adjustment of the vehicle part:

at least one drive for generating an adjusting force for the power-operated adjustment of the vehicle part, at least one actuating element configured to detect an operating event for adjusting the vehicle part triggered by a user and to generate, in response to a detection of the operating event, an adjustment signal, and a sensor device configured to detect an obstacle in the adjustment path of the vehicle part in a contactless way and to generate, upon detection of an obstacle in the adjustment path of the vehicle part, an obstacle signal, wherein on the basis of the adjustment signal (VS) the at least one drive (2A, 2B) is actuated for the power-operated adjustment of the vehicle part (H) and, if the obstacle signal (HS) is present, the at least one drive (2A, 2B) is actuated for stopping and/or reversing an adjustment of the vehicle part (H), the method comprising:

(a) queueing a generated adjustment signal until an obstacle signal no longer is present, and only then actuating the at least one drive for the adjustment of the vehicle part, or (b) actuating the at least one drive for the adjustment of the vehicle part, in the presence of an adjustment signal and an obstacle signal, from the closed position or the at least one open position at a reduced adjustment speed that is less than an adjustment speed at which the vehicle part is adjusted when the adjustment signal, but no obstacle signal is present.

16. An adjustment device for a power-operated adjustment of a vehicle part that is adjustable on a vehicle along an adjustment path between a closed position and at least one open position, the adjustment device comprising:

at least one drive for generating an adjusting force for the power-operated adjustment of the vehicle part, at least one actuating element configured to detect an operating event triggered by a user for adjusting the vehicle part and to generate, in response to a detection of the operating event, an adjustment signal, a sensor device configured to detect an obstacle in a monitoring region of the sensor device in a contactless way and to generate, upon detection of an obstacle in the monitoring region, an obstacle signal, wherein the at least one actuating element lies within the monitoring region, and an electronic control device coupled to the at least one drive, the at least one actuating element and the sensor device, and configured to actuate, based on the adjustment signal, the at least one drive for the power-operated adjustment of the vehicle part and to actuate, if the obstacle signal is present, the at least one drive for stopping and/or reversing an adjustment of the vehicle part, wherein the sensor device and/or the electronic control device is configured such that an obstacle in a section of the monitoring region in which the actuating element lies at least temporarily does not lead to an actuation of the at least one drive in order to stop and/or reverse an adjustment of the vehicle part when an adjustment signal has been generated.

17. The adjustment device according to claim 16, wherein a monitoring of the section of the monitoring region in which the actuating element lies can at least temporarily be deactivated upon a generation of the adjustment signal, so that an obstacle in the monitored section of the monitoring region does not lead to the generation of an obstacle signal when an adjustment signal has been generated.

18. The adjustment device according to claim 16, wherein the electronic control device is configured to at least temporarily ignore an obstacle signal that goes back to a detected obstacle in the section of the monitoring region in which the actuating element is located, so that such an obstacle signal does not lead to the actuation of the at least one drive in order to stop and/or reverse an adjustment of the vehicle part when an adjustment signal has been generated.

19. A method for a power-operated adjustment of a vehicle part that can be adjusted on a vehicle along an adjustment path between a closed position and at least one open position, wherein at least the following is provided for the power-operated adjustment of the vehicle part:

at least one drive for generating an adjusting force for the power-operated adjustment of the vehicle part, at least one actuating element configured to detect an operating event triggered by a user for adjusting the vehicle part and to generate, in response to a detection of the operating event, an adjustment signal, and a sensor device configured to detect an obstacle in a monitoring region of the sensor device in a contactless way and to generate, upon detection of an obstacle in the monitoring region, an obstacle signal, wherein the actuating element lies within the monitoring region, the method comprising:

actuating, on the basis of the adjustment signal, the at least one drive for the power-operated adjustment of the vehicle part and, if the obstacle signal is present, actuating the at least one drive for stopping and/or reversing an adjustment of the vehicle part, except at least temporarily not actuating the at least one drive to stop and/or reverse an adjustment of the vehicle part when an adjustment signal has been generated and when an obstacle is present in a section of the monitoring region in which the actuating element lies.

* * * * *